(No Model.)
O. KUTSCHE.
STEAM CONDENSER.
No. 412,029. Patented Oct. 1, 1889.
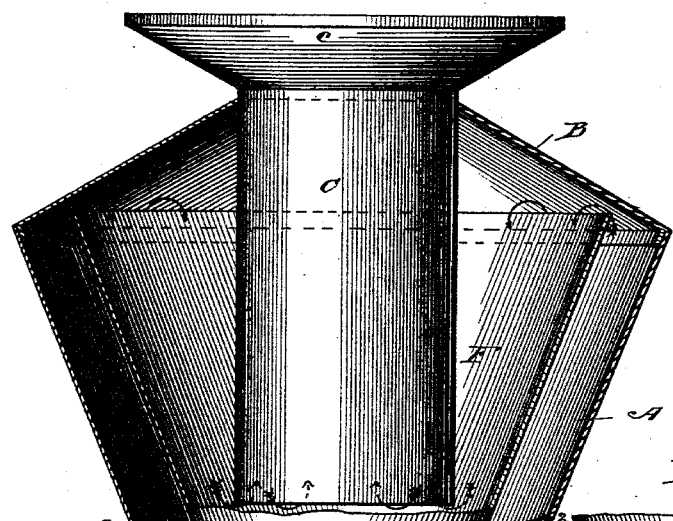
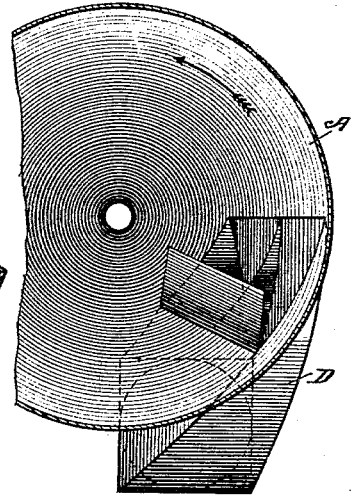
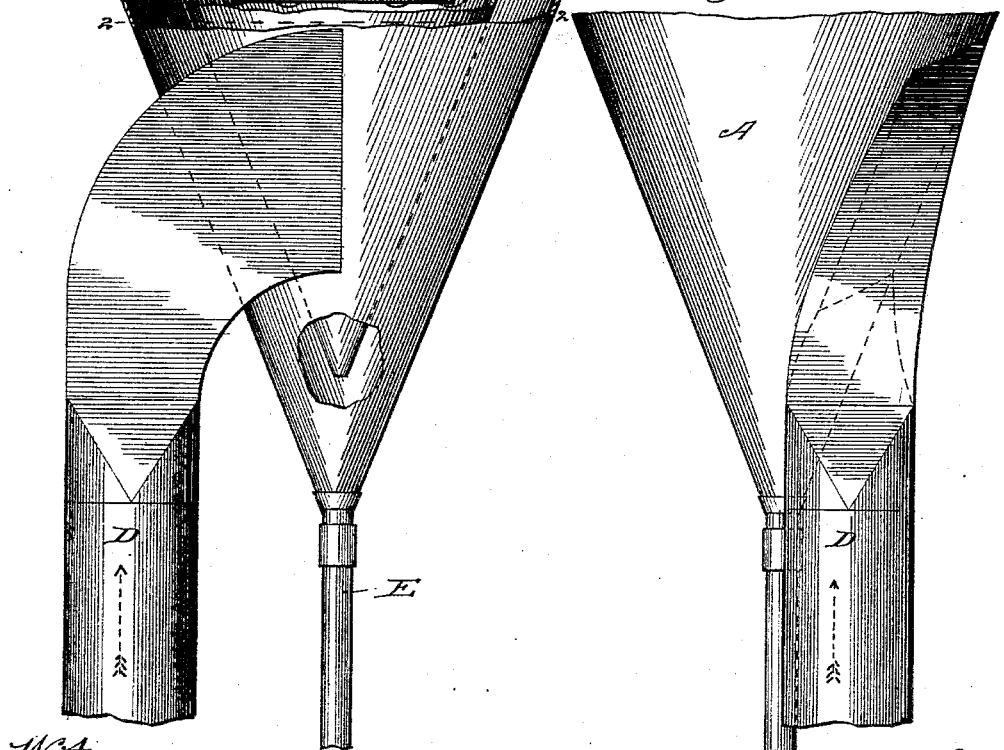
Witnesses
T. F. Mann
Martin Olsen
Inventor,
Oswald Kutsche
By Offield & Towle, Attys.

UNITED STATES PATENT OFFICE.

OSWALD KUTSCHE, OF CHICAGO, ILLINOIS.

STEAM-CONDENSER.

SPECIFICATION forming part of Letters Patent No. 412,029, dated October 1, 1889.

Application filed January 21, 1889. Serial No. 297,019. (No model.)

*To all whom it may concern:*

Be it known that I, OSWALD KUTSCHE, a citizen of the United States, residing at Chicago, in the county of Cook and State of Illinois, have invented certain new and useful Improvements in Steam-Condensers, of which the following is a specification.

My invention relates to an improvement in condenser heads or traps into which exhaust-pipes from steam-engines are made to discharge for the purpose of condensing the steam and conducting the water of condensation back to the boiler. The purpose and object of this condensation are well understood; but the devices for effecting it are imperfect.

In carrying out my invention I construct the body of the condenser-head, preferably, in the form of an inverted cone with a drip-pipe connected to its apex and with a central discharge for the dry steam in its upper end. Instead of discharging the steam into the cone in the manner heretofore practiced, I so construct the device that the inlet-pipe enters the condensing-chamber tangentially, whereby the steam, on entering said chamber, is directed against the curved wall of the chamber and moves therein in a whirling body. By this means the steam is caused to travel for a considerable distance before it reaches the outlet, and thereby a more perfect condensation is secured. The principal work of separation is effected by the operation of centrifugal force under which the water particles are thrown out of the steam and conducted by the sloping walls to the discharge-orifice, while the steam, thus rendered comparatively dry, escapes in an opposite direction. I use supplemental devices—viz., an interior cone—and a pipe surrounding the steam-discharge opening and projected down into the body of the condensing-chamber, whereby the path of the escaping steam is lengthened and a more thorough condensation secured.

In the accompanying drawings, Figure 1 is a side elevation, partly in section. Fig. 2 is a sectional view on line 2 2 of Fig. 1, a fragmentary portion being omitted; and Fig. 3 is a side elevation of the condenser below the line 2 2 of Fig. 1, but from a different view point.

In the drawings, A represents the peripheral wall of the condensing-chamber, which wall is imperforate. The upper end of the chamber is inclosed by a wall B, preferably sloping, as shown, and having centrally thereof a discharge-orifice for the dry steam. Secured in said orifice is a pipe C, the lower end of which projects into the condensing-chamber, and the upper end of which may terminate flaring, as shown at c.

D is the inlet-pipe which enters the condensing-chamber tangentially, as clearly shown in Figs. 2 and 3. The inlet-pipe enters the chamber near its smaller end, which is the lower end in use, and the steam is thereby caused to travel substantially the length of the chamber before it can escape over the upper end of the interior cone hereinafter described. I also prefer to construct the portion of the inlet-pipe which joins onto the cone rectangular in cross-section.

E is a discharge-pipe for the water of condensation.

F is a supplementary cone suspended within the condensing-chamber, so as to leave an annular space between it and the wall of said chamber. The lower end of this cone is truncated to permit of the water discharging from the interior thereof.

It will be understood that the pipe D is connected with the exhaust of a steam-engine. The course of the steam is partially indicated by arrows. On entering the chamber the steam will gyrate or whirl about the chamber, it having sufficient force to cause it to move rapidly. As it begins to lose its water under the combined effects of centrifugal force and the condensation effected by the contact with the walls of the chamber, it rises and, seeking escape, passes downwardly into the interior of the inner cone, and thence escapes through pipe C. This device not only more effectually condenses the steam, but it also avoids any back pressure and permits the steam to escape without puffing. This is due to the fact that the steam-outlet is much greater in diameter than its inlet.

I claim—

1. In a condenser, the combination, with a condensing-chamber having separate outlets for steam and water and a tangential inlet-opening, of a collar or pipe surrounding the steam outlet and projected into the chamber, and a supplementary deflector suspended within the chamber, its upper end surrounding the outlet-pipe and its lower end having an orifice for the escape of water from its interior, substantially as described.

2. A condenser having an inverted-cone-shaped condensing-chamber formed by an imperforate peripheral wall and having an outlet for the dry steam at its base, and an outlet for the water of condensation at its apex, and an inlet for the steam entering the condensing-chamber tangentially and near its apex, substantially as described.

OSWALD KUTSCHE.

Witnesses:
C. C. LINTHICUM,
FREDERICK C. GOODWIN.